US012061049B2

(12) United States Patent
Steiner et al.

(10) Patent No.: US 12,061,049 B2
(45) Date of Patent: Aug. 13, 2024

(54) MODULAR THERMOACOUSTIC ENERGY CONVERTER

(71) Applicant: ETALIM INC., Burnaby (CA)

(72) Inventors: Thomas Walter Steiner, Burnaby (CA); Kristjan Tod Gottfried, Gabriola (CA); Maarten Johannes Hermanus Elferink, Vancouver (CA)

(73) Assignee: ETALIM INC., Burnaby (CA)

( * ) Notice: Subject to any disclaimer, the term of this patent is extended or adjusted under 35 U.S.C. 154(b) by 0 days.

(21) Appl. No.: 18/245,526

(22) PCT Filed: Sep. 15, 2021

(86) PCT No.: PCT/CA2021/051286
§ 371 (c)(1),
(2) Date: Mar. 15, 2023

(87) PCT Pub. No.: WO2022/056629
PCT Pub. Date: Mar. 24, 2022

(65) Prior Publication Data
US 2023/0366635 A1 Nov. 16, 2023

Related U.S. Application Data

(60) Provisional application No. 63/079,624, filed on Sep. 17, 2020.

(51) Int. Cl.
*F28D 17/02* (2006.01)
*F28D 7/00* (2006.01)

(52) U.S. Cl.
CPC .......... *F28D 17/02* (2013.01); *F28D 7/0075* (2013.01)

(58) Field of Classification Search
CPC ........ F28D 17/02; F28D 7/0075; F28D 17/04; F25B 2309/1403

(Continued)

(56) References Cited

U.S. PATENT DOCUMENTS

2022/0186680 A1* 6/2022 Steiner .................. F02G 1/057

FOREIGN PATENT DOCUMENTS

CA 2885178 C * 8/2020 ............. F02G 1/043
CN 105526049 B * 5/2018

(Continued)

OTHER PUBLICATIONS

International Search Report for PCT/CA2021/051286 dated Dec. 7, 2021, 7 pages.

*Primary Examiner* — Jon T. Schermerhorn, Jr.
(74) *Attorney, Agent, or Firm* — Thorpe North & Western; Jason R. Jones (57) ABSTRACT

A modular thermal apparatus for performing transformation between thermal and acoustic energy is disclosed and includes a housing, first and second fluid ducts extending therethrough, and a regenerator having axially extending regenerator fluid passages. A first heat exchanger conducts thermal energy in the axial direction and includes transversely oriented fluid passages extending through a thermally conductive body and changing direction within the body to terminate axially aligned with the regenerator fluid passages. The apparatus also includes a second heat exchanger having fluid passages extending through a thermally conductive body and terminating in fluid communication with the regenerator fluid passages. Thermal energy is transferred between the heat exchangers and an external thermal energy source or sink. The housing withstands a pressure associated with a pressurized working gas and the fluid ducts provide for connection of the apparatus as a module within an acoustic power loop.

20 Claims, 9 Drawing Sheets

(58) Field of Classification Search
USPC .............................................................. 165/4
See application file for complete search history.

(56) References Cited

FOREIGN PATENT DOCUMENTS

| | | | | | |
|---|---|---|---|---|---|
| CN | 110454344 | A | * | 11/2019 | |
| CN | 111271189 | A | * | 6/2020 | ............. F02G 1/043 |
| CN | 110701823 | B | * | 4/2021 | ............. F25B 21/00 |
| WO | WO 2018/094500 | A1 | | 5/2018 | |
| WO | WO-2020191479 | A1 | * | 10/2020 | ............. F02G 1/057 |

* cited by examiner

MODULAR THERMOACOUSTIC ENERGY CONVERTER

BACKGROUND

1. Field

This disclosure relates generally to a thermoacoustic transducer, and more particularly to an apparatus for performing energy transformation between thermal energy and acoustic energy.

2. Description of Related Art

Thermoacoustic transducers may be configured to convert between mechanical energy and thermal energy. A thermoacoustic transducer may be configured to operate as a heat engine, in which higher temperature thermal energy is received and lower temperature thermal energy rejected, while the transducer converts a portion of the thermal energy into mechanical energy. The mechanical energy may be used to drive an electrical generator, for example. Alternatively, a thermoacoustic transducer may be configured to operate as a heat pump where mechanical energy is received, and the transducer converts the mechanical energy into a thermal energy transfer from lower temperature to higher temperature.

Thermoacoustic transducers generally include a thermal apparatus that performs energy transformation between thermal energy and acoustic energy within an acoustic power loop. When configured as a heat engine, increases in operating efficiency may be achieved by increasing a temperature differential between a hot side and a cold side of the thermal apparatus. In a typical thermoacoustic transducer implementation, this temperature differential may be several hundred degrees and will cause significant material stresses within the apparatus.

SUMMARY

In accordance with one disclosed aspect there is provided a modular thermal apparatus for performing an energy transformation between thermal energy and acoustic energy. The apparatus includes a housing, first and second fluid ducts extending through the housing, and a regenerator providing a plurality of regenerator fluid passages extending in an axial direction between first and second spaced apart surfaces, the regenerator being enclosed within a regenerator sleeve portion of the housing. The apparatus also includes a first heat exchanger within the housing, the first heat exchanger including a thermally conductive body configured to conduct thermal energy in a direction substantially aligned with the axial direction. The first heat exchanger also includes a first plurality of fluid passages extending through the thermally conductive body and providing fluid communication between the first fluid duct and the plurality of regenerator fluid passages at the first surface of the regenerator, the first plurality of fluid passages oriented transversely with respect to the axial direction at the first fluid duct and changing direction within the thermally conductive body to terminate in fluid communication and axially aligned with the plurality of regenerator fluid passages at the first surface of the regenerator. The apparatus also includes a second heat exchanger within the housing, the second heat exchanger including a thermally conductive body and a second plurality of fluid passages extending through the thermally conductive body and providing fluid communication between the second fluid duct and the plurality of regenerator fluid passages at the second surface of the regenerator. The first and second heat exchangers are operable to transfer thermal energy between the respective heat exchangers and an external thermal energy source or thermal energy sink. The housing is configured to withstand a pressure associated with a pressurized working gas within the first fluid passages, the regenerator fluid passages, and the second fluid passages, the first and second fluid ducts providing for connection of the thermal apparatus as a module within an acoustic power loop to cause a periodic flow of the pressurized working gas through the respective fluid passages of the apparatus, the periodic flow facilitating an exchange of thermal energy between the working gas and the first and second heat exchangers.

The thermally conductive body of the second heat exchanger may be configured to conduct thermal energy in a direction substantially aligned with the axial direction and the second plurality of fluid passages may be oriented transversely with respect to the axial direction at the second fluid duct and change direction within the thermally conductive body to terminate in fluid communication and axially aligned with the plurality of regenerator fluid passages at the second surface of the regenerator.

The housing may include a housing portion enclosing the first heat exchanger sealingly connected to the regenerator sleeve and a housing portion enclosing the second heat exchanger sealingly connected to the regenerator sleeve.

The housing portion enclosing at least one of the first heat exchanger and the second heat exchanger may include a thermal input portion for receiving thermal energy by conduction through a wall of the thermal input portion.

The thermal input portion may include a curved wall capable of withstanding the working gas pressure at the elevated temperature.

The apparatus may include a thermal conductor disposed to conduct thermal energy from the thermal input portion to the thermally conductive body.

The thermal conductor may include a copper body having a curved surface corresponding to an inner surface of the curved wall of the thermal input portion of the housing, and the curved surface of the copper body may be diffusion bonded to the inner surface of the thermal input portion.

The curved wall of the thermal input portion may include one of a single curved wall, a plurality of adjacent curved walls, or a generally hemispherical curved wall.

The thermal input portion may include a plurality of protrusions extending outwardly from an outer surface of thermal input portion, the protrusions providing an extended surface area for exchanging thermal energy between the thermal input portion and a thermal energy source or sink.

The thermal input portion may include a material capable of withstanding the elevated temperature associated with the thermal energy.

The elevated temperature may be a temperature above 450° C. and the material of the thermal input portion may include a stainless steel material.

The elevated temperature may be a temperature above 600° C. and the material of the thermal input portion may include a superalloy.

The apparatus may include a third heat exchanger within the housing for transferring thermal energy between a heat transfer liquid flowing through the third heat exchanger and the thermally conductive body of at least one of the first heat exchanger and the second heat exchanger.

Each of the thermally conductive bodies of the first and second heat exchangers may be in thermal communication with one of a heat transfer liquid, a heat pipe, or an external thermally conductive body.

The regenerator sleeve may include a wall having a wall thickness selected to reduce thermal conduction in the axial direction between the first heat exchanger and the second heat exchanger, and an increased wall thickness at an end proximate the first heat exchanger to provide sufficient creep strength to withstand operation at the elevated temperature over an expected lifetime of the apparatus.

A plurality of the modular thermal apparatus of claim 1 may be connected in a parallel configuration in which respective first fluid ducts and second fluid ducts are connected in parallel within the acoustic power loop.

The acoustic power loop may include a common thermal buffer duct and the first fluid ducts may be connected in fluid communication with the thermal buffer duct, the thermal buffer duct being shaped to reduce convective heat transfer from the working gas due to circulating gas flows within the thermal buffer duct.

A plurality of the modular thermal apparatus of claim 1 may be connected in a serial configuration in which respective first fluid ducts and second fluid ducts are connected in series within the acoustic power loop.

A plurality of the apparatus of claim 1 may be connected in a cascade within the acoustic power loop, the cascade including at least one of one or more of the apparatus connected in a series configuration within the acoustic power loop, and a plurality of the apparatus having first fluid ducts and second fluid ducts connected in a parallel configuration within the acoustic power loop.

Thermal energy may be received at elevated temperature at the thermally conductive body of the first heat exchanger and thermal energy may be rejected at the thermally conductive body of the second heat exchanger at a lower temperature and the apparatus may act as a thermal amplifier for amplifying acoustic power within the acoustic power loop.

Mechanical energy received within the acoustic power loop may be converted in the apparatus to cause thermal energy to be received at a low temperature at the thermally conductive body of the first heat exchanger and thermal energy to be rejected at the thermally conductive body of the second heat exchanger at a higher temperature.

Other aspects and features will become apparent to those ordinarily skilled in the art upon review of the following description of specific disclosed embodiments in conjunction with the accompanying figures.

BRIEF DESCRIPTION OF THE DRAWINGS

In drawings which illustrate disclosed embodiments.

DETAILED DESCRIPTION

Figure 1:
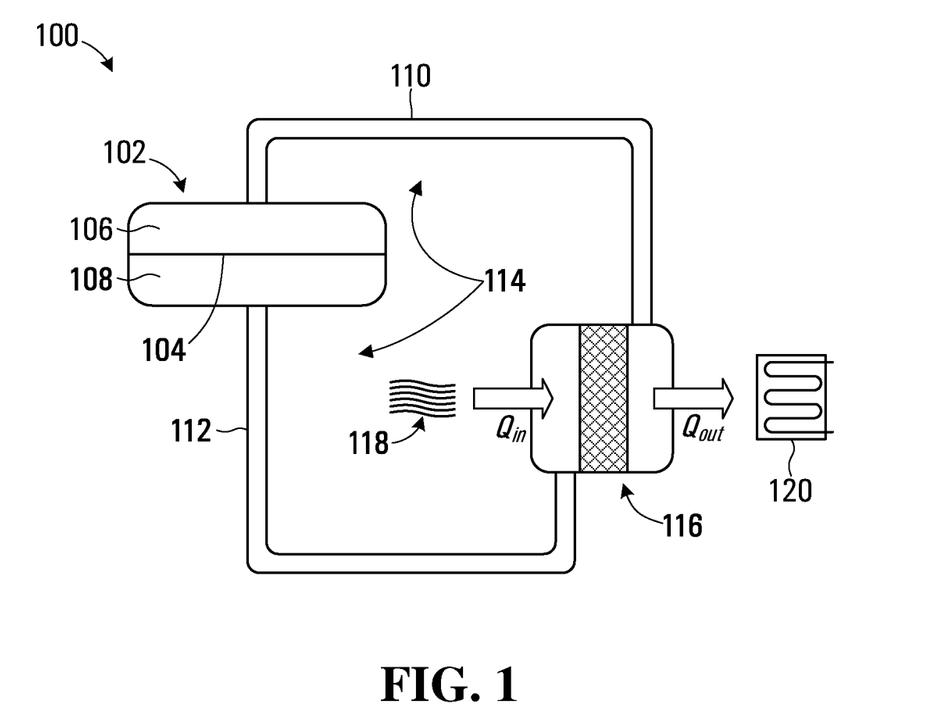
FIG. 1 is a schematic view of an example of a thermoacoustic transducer.

Referring to FIG. 1, an example of a thermoacoustic transducer is shown schematically at 100. The thermoacoustic transducer 100 includes a mechanical converter 102 operable to provide power conversion between acoustic power and mechanical power. The mechanical converter 102 includes a diaphragm 104 defining a first chamber 106 and a second chamber 108 within the mechanical converter. The thermoacoustic transducer 100 also includes a first transmission duct 110 in fluid communication with the first chamber 106 and a second transmission duct 112 in fluid communication with the second chamber 108. The first transmission duct 110, mechanical converter 102, and second transmission duct 112 form an acoustic power loop 114 having a working volume for containing a working gas operable to facilitate acoustic power flow between the second chamber 108 and the first chamber 106.

In one embodiment the working gas in the working volume comprises helium at a static pressure $p_m$ of about 120 bar. Further details of the thermoacoustic transducer 100 and acoustic power loop are disclosed in commonly owned PCT Patent application PCT/CA2013/000794 published as WO 2014/043790 and entitled "Thermoacoustic Transducer Apparatus Including a Transmission Duct", which is incorporated herein by reference in its entirety.

The thermoacoustic transducer 100 also includes a thermal apparatus 116 connected in fluid communication with the acoustic power loop 114. The thermal apparatus 116 is operable to perform an energy transformation between thermal energy and acoustic energy, the acoustic energy being associated with a periodic flow of a working gas within the acoustic power loop 114. The thermal apparatus 116 is in thermal communication with a thermal energy source 118 for transferring thermal energy $Q_{in}$ into the thermal apparatus and is also in thermal communication with a heat sink 120 for transferring thermal energy $Q_{out}$ out of the thermal apparatus. When the thermoacoustic transducer 100 is used as an engine, the energy flow associated with $Q_i$, and $Q_{out}$ is converted by the thermal apparatus 116 into acoustic energy, thereby amplifying the acoustic power traveling through the thermal apparatus and within the acoustic power loop 114. The amplified acoustic power leaving the thermal apparatus 116 propagates along the second transmission duct 112 back to the mechanical converter 102, where it is received in the second chamber 108.

In operation of the thermoacoustic transducer 100 as an engine, the diaphragm 104 undergoes resilient cyclical displacement to cause pressure oscillations within the acoustic power loop. The working gas pressure within the working volume will thus swing between $p_m \pm |p|$, where $|p|$ is a differential pressure swing amplitude. When the diaphragm 104 is displaced so as to cyclically reduce and expand a volume of the first chamber 106, the resulting compression and rarefaction in the working gas produces acoustic power which propagates through the first transmission duct 110 to the thermal apparatus 116. The amplification of acoustic power in the thermal apparatus 116 thus provides sufficient power for sustaining periodic movement of the diaphragm 104, while also providing useful mechanical output power. The process described above operates at a natural frequency associated with the thermoacoustic transducer 100. In one embodiment the thermoacoustic transducer 100 may be configured for a natural frequency of about 500 Hz or higher.

The cyclical displacement of the diaphragm 104 may be coupled to transmit mechanical power to an external system (not shown in FIG. 1). In one embodiment the diaphragm 104 may be coupled to an electromechanical transducer apparatus for converting the mechanical energy associated with the diaphragm movement into electrical energy. An example of an electromechanical transducer apparatus is disclosed in commonly owned PCT patent publication WO2015135064, entitled "Electromechanical Transducer Apparatus for Converting Between Mechanical Energy and Electrical Energy", filed on Mar. 12, 2015 and incorporated herein by reference in its entirety.

Alternatively, for operation of the thermoacoustic transducer 100 as a heat pump, an externally provided mechanical power is transmitted to the diaphragm 104 to cause the cyclic displacement of the diaphragm 104. For acoustic power flowing from the first chamber 106 to second chamber 108, the thermal apparatus 116 is configured to receive acoustic energy generated within the thermoacoustic transducer 100 and to convert the acoustic energy into a transfer of thermal energy from the external thermal source 118 to the heat sink 120 at higher temperature than the temperature of the external thermal source. Alternatively, for acoustic power flow in the reverse direction, the functions of the external thermal source and external thermal sink are interchanged.

Figures 2A, 2B:
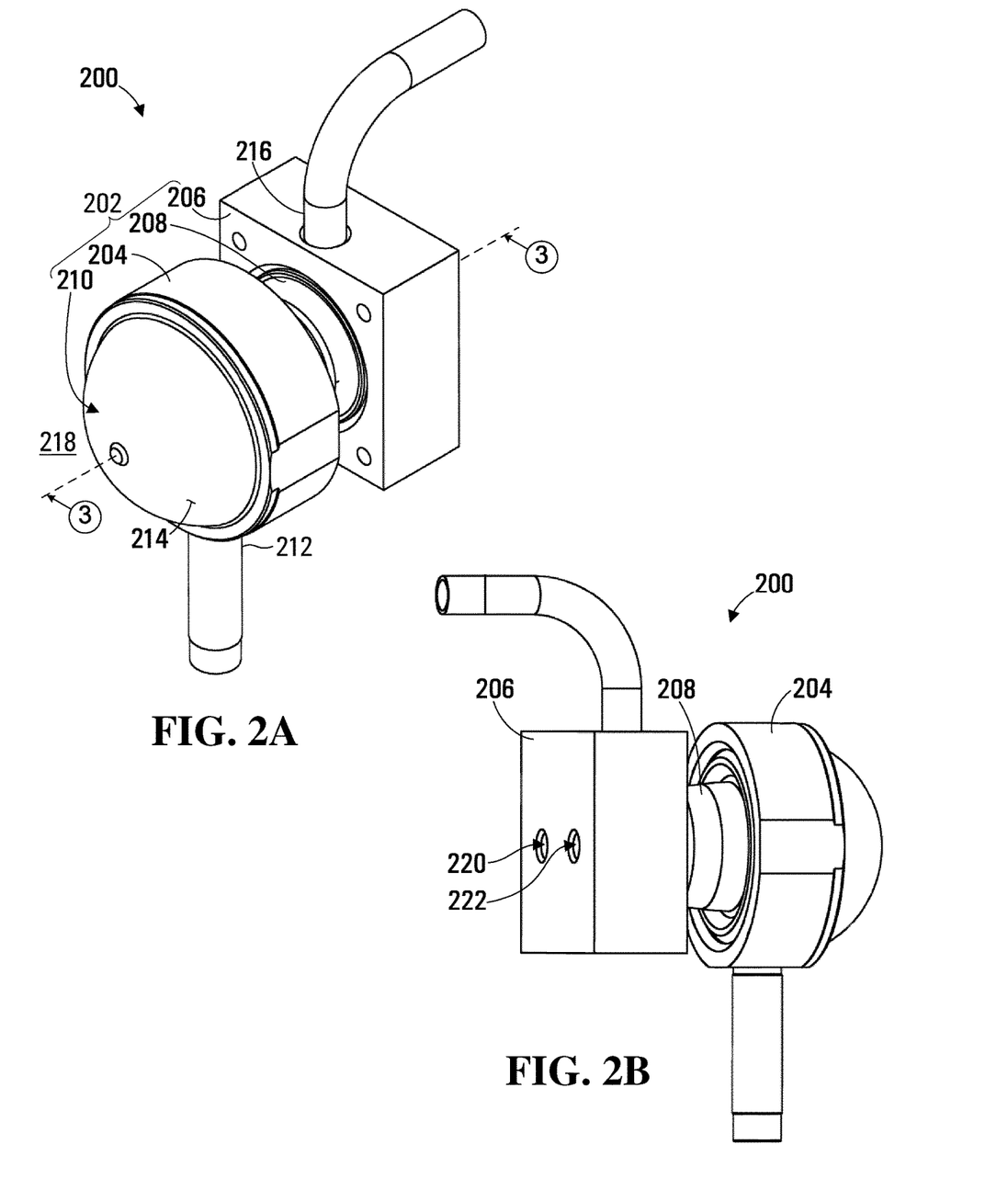
FIG. 2A is a front perspective view of a thermal apparatus according to a first disclosed embodiment.
FIG. 2B is a is a rear perspective view of the thermal apparatus shown in FIG. 2A.

Referring to FIG. 2A a thermal apparatus for performing an energy transformation between thermal energy and acoustic energy according to a first disclosed embodiment is shown generally at 200. The thermal apparatus 200 in this embodiment is configured as a thermal amplifier for use in a heat engine. The thermal apparatus 116 shown in FIG. 1 may be implemented using one or more of the thermal apparatus 200. The thermal apparatus 200 is enclosed within a housing 202. In this embodiment the housing includes portions 204-210 configured to withstand a pressure associated with the pressurized working gas within the acoustic power loop 114. The housing portion 204 encloses a first heat exchanger (described in more detail below) and has a first fluid duct 212 for connecting to the acoustic power loop 114 extending through the housing. In this embodiment, where the thermal apparatus 200 is used in a heat engine, the first heat exchanger housing portion 204 further includes a thermal input portion 210 for receiving thermal energy by conduction through the housing from the thermal energy source 118 (FIG. 1) at an elevated temperature. The thermal input portion 210 of the housing 202 includes a curved wall 214 capable of withstanding the working gas pressure at the elevated temperature. In this embodiment, the wall 214 is curved outwardly. The thermal input portion 210 may be fabricated from a material capable of withstanding the elevated temperature associated with the thermal energy. For example, in one embodiment the elevated temperature may be a temperature above 450° C. and the thermal input portion 210 may be fabricated from a stainless steel material. In another embodiment where the elevated temperature is a temperature above 600° C., the thermal input portion 210 may be fabricated from a superalloy.

Examples of suitable high temperature superalloys include nickel-chromium-based superalloys such as Inconel™ and alloys such as HAYNES® 282®. Generally, the material of the wall 214 of the thermal input portion 210 should be selected to provide sufficient creep strength at the operating temperature to prevent early failure of the housing portion 204 due to high temperature and working pressure. Additionally, a material should be selected that provides sufficient creep strength while being sufficiently thin to allow thermal conduction of heat through the wall 214 with minimum temperature loss. In the embodiments described herein, the term "sufficient" in connection with the creep strength of the thermal input portion 210 of the housing portion 204, is used to qualify the material as having a creep strength that is high enough to prevent failure of the housing portion 204 based on a reasonable expected lifetime for the thermoacoustic transducer 100.

The housing portion 206 encloses a second heat exchanger (described in more detail below) and includes a second fluid duct 216 for connecting to the acoustic power loop 114, which extends through the housing. The thermal apparatus 200 is shown in a rear perspective view in FIG. 2B. Referring to FIG. 2B, the housing portion 208 is configured as a sleeve that extends between the housing portion 204 and the housing portion 206. By configuring the portions 204-210 of the housing 202 to withstand the pressure of the working gas, the housing need not be enclosed within an additional pressure vessel. Rather for the embodiment shown, the housing 202 is able to operate within an ambient atmospheric pressure environment 218. In the embodiment shown, the housing portion 206 includes an inlet 220 for receiving a flow of heat transfer liquid and an outlet 222 for discharging the heat transfer liquid, as described in more detail below.

Figure 3:
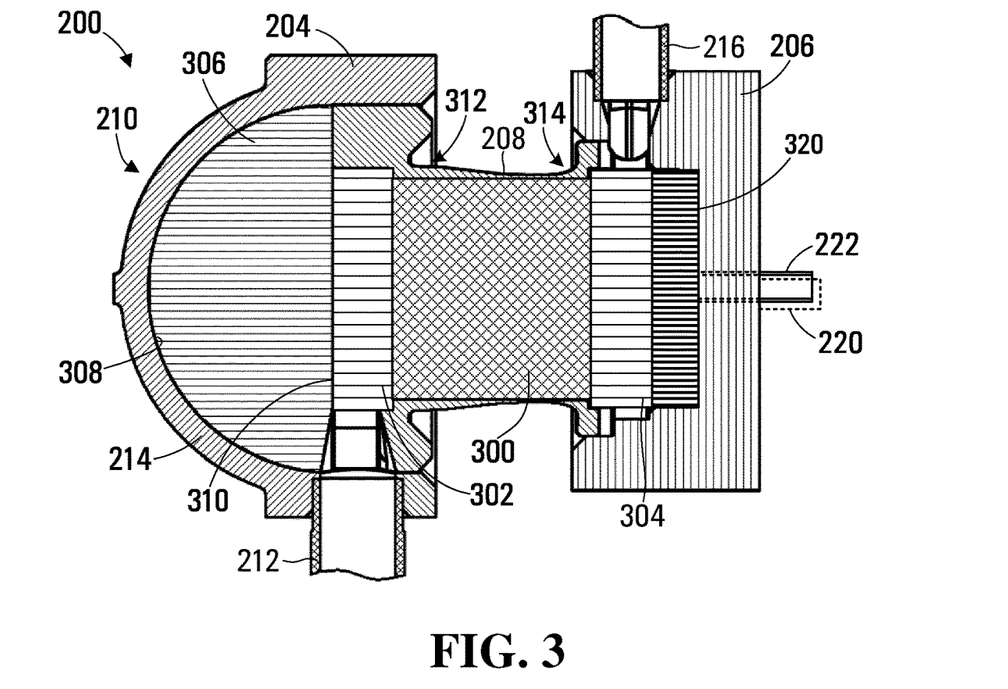
FIG. 3 is a cross sectional view the thermal apparatus taken along the lines 3-3 in FIG. 2A.

Referring to FIG. 3, the thermal apparatus 200 is shown in cross sectional view taken along the lines 3-3 in FIG. 2A. The thermal apparatus 200 includes a regenerator 300 enclosed within the regenerator sleeve 208. The thermal apparatus 200 includes a first heat exchanger 302 enclosed by a portion of the sleeve 208 and the housing portion 204 and a second heat exchanger 304 enclosed by the housing portion 206. In the embodiment shown, second heat exchanger 304 is in thermal contact with an additional heat exchanger 320, which is described in more detail below. In the embodiment shown the housing portion 204 enclosing the first heat exchanger 302 is sealingly connected to the regenerator sleeve 208 and the housing portion 206 enclosing the second heat exchanger 304 is also sealingly connected to the regenerator sleeve. In other embodiments the housing 202 may be fabricated as a unitary housing that encloses the first heat exchanger 302, the regenerator 300, and the second heat exchanger 304. The first fluid duct 212 extends through the portion 204 of the housing 202 and the second fluid duct 216 extends through the portion 206 of the housing. The first and second fluid ducts 212 and 216 provide for connection of the thermal apparatus as a module within the acoustic power loop 114 (FIG. 1). As described later herein, various serial and parallel connections between modular units of the thermal apparatus 200 may be included in the acoustic power loop 114 of the thermoacoustic transducer 100.

Figure 4:
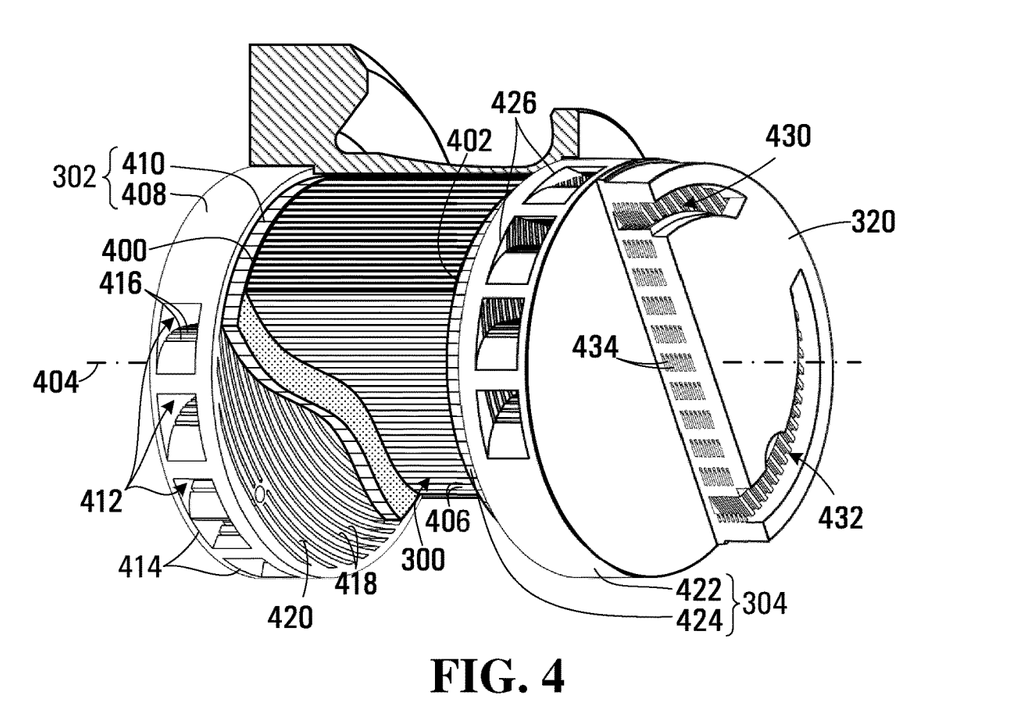
FIG. 4 is a partially cut-away perspective view of a regenerator, first heat exchanger, and second heat exchanger of the thermal apparatus shown in FIGS. 2A and 2B.

The regenerator 300, the first heat exchanger 302, and the second heat exchanger 304 are shown in a partially cut-away perspective view in FIG. 4. Referring to FIG. 4, the regenerator 300 includes a first surface 400 and a second surface 402, which are spaced apart along an axis 404. A plurality of regenerator fluid passages 406 extend in an axial direction between the first and second surfaces 400 and 402. The regenerator 300 converts thermal energy Qi, provided from the external thermal energy source 118 into acoustic energy, thereby amplifying the acoustic power traveling through the regenerator. Alternatively, acoustic energy may be consumed in the regenerator 300 in order to transfer heat from a lower temperature to a higher temperature.

The first heat exchanger 302 includes a thermally conductive body 408 and a heat exchange material 410. The first heat exchanger 302 defines a first plurality of fluid passages in fluid communication with the first fluid duct 212. The fluid passages include portions 412 that extend between a plurality of inlet/outlet openings 414 transversely through the thermally conductive body 408 with respect to the axis 404. A plurality of axially oriented fluid distribution passages 416 redirect fluid flow from a substantially transverse direction within the fluid passage portions 412 to a substantially axial direction. The axially oriented distribution passages 416 terminate in openings 418 at an interface surface 420 of the body 408. Heat flow into or out of the heat exchangers 302 and 304 is predominantly aligned with axis 404 while acoustic power enters and leaves the thermal apparatus 200 in a transverse direction.

The heat exchange material 410 includes a plurality of axially oriented fluid passages that terminate in fluid communication with the plurality of regenerator fluid passages 406 at the first surface 400 of the regenerator 300. The heat exchange material 410 may be a permeable material having high thermal conductivity. In one embodiment the heat exchanger material may include a plurality of copper or carbon fibers that are oriented in a direction generally aligned with the axis 404.

Figure 5:
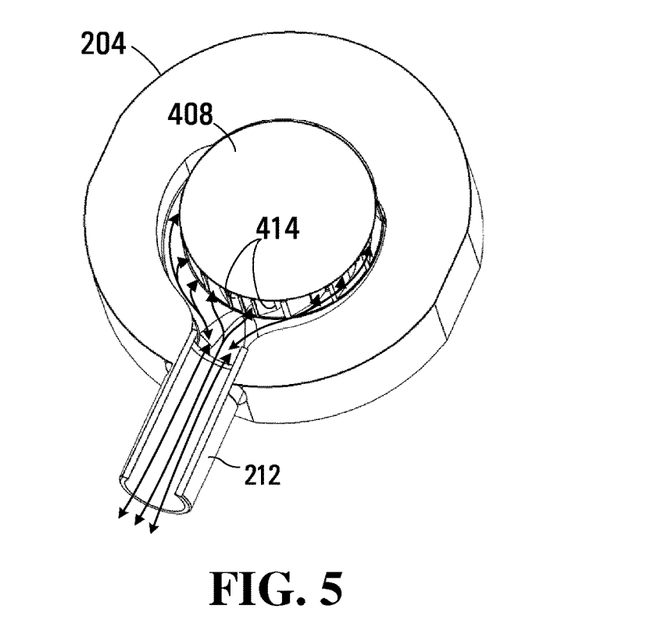
FIG. 5 is a cut away perspective view of a portion of a housing of the thermal apparatus shown in FIGS. 2A and 2B.

Referring to FIG. 5, the housing portion 204 and first fluid duct 212 are shown in a cut away view for the purposes of illustrating working gas flow between the first fluid duct 212 and the plurality of inlet/outlet openings 414. In this embodiment, the plurality of inlet/outlet openings 414 are distributed around a portion of the periphery of the body 408 of the first heat exchanger 302. The housing 204 is shaped to channel the flow between the first fluid duct 212 and the openings 414, as illustrated by the arrows in FIG. 5.

Referring back to FIG. 4, the second heat exchanger 304 includes a thermally conductive body 422 and a heat exchange material 424. The second heat exchanger 304 defines a second plurality of fluid passages in fluid communication with the second fluid duct 216. The second plurality of fluid passages are similarly configured to the first plurality of fluid passages of the first heat exchanger 302, in that axially oriented fluid passages in the heat exchange material 424 are in fluid communication with the plurality of regenerator fluid passages 406 at the second surface 402 of the regenerator 300. In the embodiment shown, the second plurality of fluid passages extend axially through the body 422 of the second heat exchanger, undergo a change to a transverse orientation and terminate at inlet/outlet openings 426 in fluid communication with the second fluid duct 216. The second fluid duct 216 and the housing portion 206 are configured generally as shown in FIG. 5 for directing working gas flow between the second fluid duct and the inlet/outlet openings 426. In other embodiments the second plurality of fluid passages may extend generally axially through the body 422 of the second heat exchanger 304.

In the embodiment shown in FIG. 4, second heat exchanger 304 is coupled to an additional heat exchanger 320 (i.e. a third heat exchanger). The third heat exchanger 320 includes an inlet 430, an outlet 432, and a plurality of fluid flow passages 434 for receiving and channeling a heat transfer liquid flow through the heat exchanger. Referring back to FIG. 2B, the housing portion 206 enclosing the second heat exchanger 304 includes the inlet 220 for receiving a heat transfer liquid and the outlet 222 for discharging the liquid. The inlet 220 is in fluid communication with the inlet 430 and the outlet 222 is in fluid communication with the outlet 432. The heat transfer liquid thus flows into the fluid inlet 430, through the plurality of fluid flow passages 434 of the third heat exchanger 320 and is discharged through the outlet 432. The third heat exchanger 320 adds or removes thermal energy to or from the conductive body 422.

In one embodiment the first heat exchanger 302 and second heat exchanger 304 may be implemented using a heat exchange apparatus configured as disclosed in commonly owned U.S. Provisional Patent Application No. 62/281,548 by Steiner et al. filed on Jan. 21, 2016 and entitled "Apparatus and System for Exchanging Heat With a Fluid", which is incorporated herein by reference in its entirety.

Referring back to FIG. 3, the thermal apparatus 200 further includes a thermal conductor 306. The thermal conductor 306 extends between the inner surface 308 of the wall 214 of the thermal input portion 210 and a thermal energy receiving surface 310 of the first heat exchanger 302. The thermal conductor 306 is disposed to conduct thermal energy received at the wall 214 of the thermal input portion 210 to the thermally conductive body 408 of the first heat exchanger. In the embodiment shown, the thermal conductor 306 has a curvature corresponding to the curvature of the inner surface 308 of the wall 214. In one embodiment, the thermal conductor 306 may be diffusion bonded to the inner surface 308 of the thermal input portion 210. The thermal conductor 306 may be fabricated from copper.

Forces due to the relatively high working gas pressure within the fluid passages of the thermal apparatus 200 are transmitted to the various portions of the housing 202 (FIG. 2A), which must be designed to withstand the pressure. In this embodiment, the thermal input portion 210 must also withstand high temperatures. The combined effect of the pressure and the temperature may cause increased creep within the wall 214 of the thermal input portion 210. Creep effects over time may lead to premature failure of the wall 214 of the thermal input portion 210. In the embodiment shown, the curvature of the wall 214 reduces the stresses within the wall due to the working gas pressure. The curved wall 214 acts to bi-axially distribute stresses within the curved wall 214, thus reducing stress induced creep effects over the lifetime of the thermoacoustic transducer 100. The curvature of the wall 214 also reduces the required thickness of the wall 214, which reduces thermal resistance for thermal energy being conducted from the source 118 into the thermal conductor 306. For the example of the wall 214 being fabricated from Haynes 282, the thermal conductivity of the wall would be in the region of 27 W/mK, while the thermal conductivity of a copper thermal conductor 306 would be in the region of 350 W/mK.

In operation, thermal energy received from the thermal energy source 118 at an outer surface of the wall 214 is conducted through the thermal input portion 210 and through the thermal conductor 306 to the thermal energy receiving surface 310 of the first heat exchanger 302. The thermal conduction occurs in a substantially axial direction. The body 408 of the first heat exchanger 302 is configured to facilitate thermal conduction in an axial direction through the body to the heat exchange material 410. The body 408 is further configured to change the working gas flow from a transverse direction at the first fluid duct 212 into an axial direction at the interface surface 420 of the body 408. The working gas flows within the heat exchange material 410 are heated by the thermal energy coupled into the heat exchange material through the thermal conductor 306 and thermally conductive body 408. While some heating of the working gas may occur within the thermally conductive body 408, a significant proportion of the thermal energy is transferred to the working gas within the fluid passages of the heat exchange material 410.

The regenerator 300 may be implemented using the regenerator medium disclosed in commonly owned PCT patent application PCT/CA2020/050206 filed on Feb. 18, 2020 and entitled "Thermal Regenerator Apparatus", which is incorporated herein by reference in its entirety.

In operation of the thermal apparatus 200, the temperature at the second heat exchanger 304 may be maintained close to an ambient temperature of the environment 218. A typical thermal energy source 118 such as an exhaust gas may have a temperature well in excess of 500° C. The temperature difference between the first and second surfaces 400 and 402 of the regenerator 300 may thus be large. The plurality of regenerator fluid passages 406 are generally configured to enhance thermal conduction in a transverse direction while maintaining low thermal conduction in the axial direction to prevent heat transfer through the regenerator 300. The sleeve 208 enclosing the regenerator 300 must withstand the working gas pressure which sets a lower bound on a wall thickness of the sleeve. However, to reduce thermal conduction through the sleeve 208 in the axial direction between the first heat exchanger 302 and the second heat exchanger 304, the wall thickness of the sleeve should be minimized. In the embodiment shown, the sleeve 208 has an increased wall thickness at an end 312 proximate the first heat exchanger 302 and a reduced wall thickness at an end 314 proximate the second heat exchanger 304. The thicker wall at the end 312 of the sleeve 208 provides increased creep strength for withstanding operation at the elevated temperatures associated with the first heat exchanger 302. Creep effects increase significantly with increasing temperature. The end 314 of the sleeve, which will be at a significantly lower temperature, is not as susceptible to deformation by creep. The narrowing of the wall of the sleeve 208 at the end 314 thus increases the thermal resistance of the sleeve and reduces thermal conduction through the sleeve wall.

At the second heat exchanger 304, the heat exchange material 424 absorbs heat from the working gas flowing axially through the heat exchange material 424. The absorbed heat is transported in an axial direction through the body 422 to the additional heat exchanger 320, where it is removed by the heat transfer liquid flowing through the plurality of fluid flow passages 434 in the additional heat exchanger 320. The fluid passages within body 422 are configured to cause the working gas to undergo a change from axially oriented flow at interface 402 to transversely oriented flow at openings 426.

Figure 6:
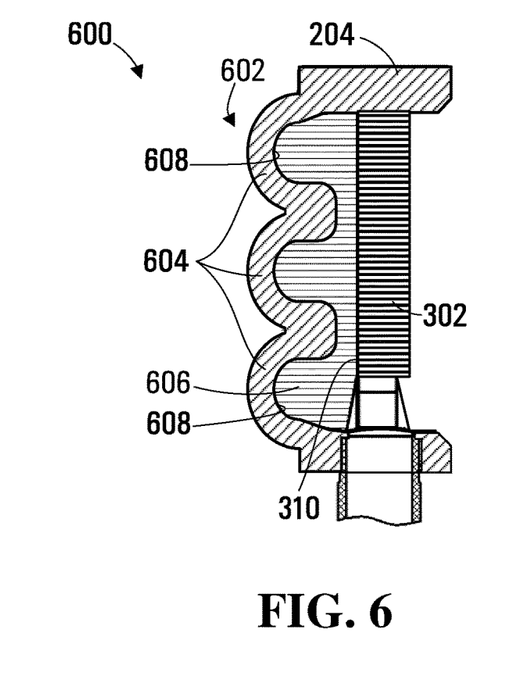
FIG. 6 is a cross sectional view of an alternative embodiment of a thermal input portion of a housing for a thermal apparatus.

In the embodiment shown, the thermal input portion 210 has a generally hemispherical outwardly directed curved surface defined by the wall 214. In other embodiments the curved wall 214 may be configured as an ellipsoidal, torispherical, or other curved shape. Referring to FIG. 6, in another embodiment shown at 600 the housing portion 204 has a thermal input portion 602 including a plurality of adjacent curved wall portions 604. A thermal conductor 606 extends between respective inner surfaces 608 of the curved wall portions 604 and the thermal energy receiving surface 310.

Figure 7:
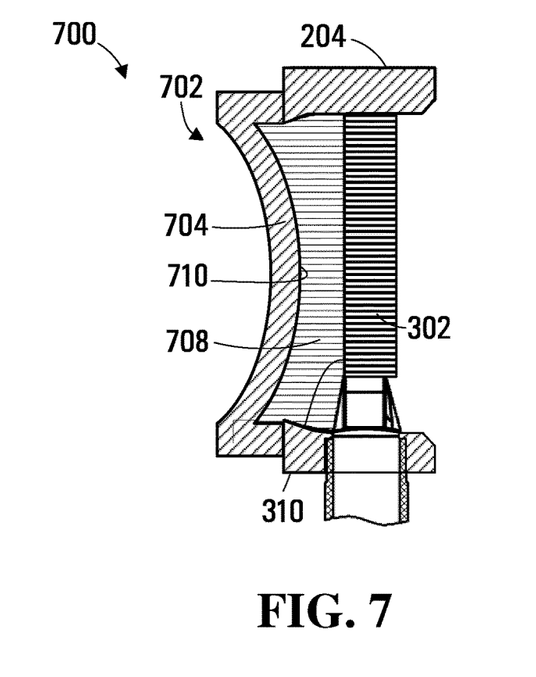
FIG. 7 is a cross sectional view of another embodiment of a thermal input portion of a housing for a thermal apparatus.

Referring to FIG. 7, in another embodiment of shown at 700 the housing portion 204 has a thermal input portion 702 including an inwardly curved wall 704. A thermal conductor 708 extends between an inner surface 710 of the curved wall 704 and the thermal energy receiving surface 310.

The embodiments shown in FIGS. 6 and 7 have the advantage of reducing an axial dimension of the thermal conductors 606 and 708, when compared to the thermal conductor 306 shown in FIG. 3. The reduced axial dimension reduces the thermal resistance for the heat transfer thermal conductors 606 and 708. The advantage of the embodiment of FIG. 3 is a greater surface area for conduction of heat through the thermal input portion 210 of the wall 214, thereby reducing a thermal resistance for thermal input to the apparatus 200.

Figure 8:
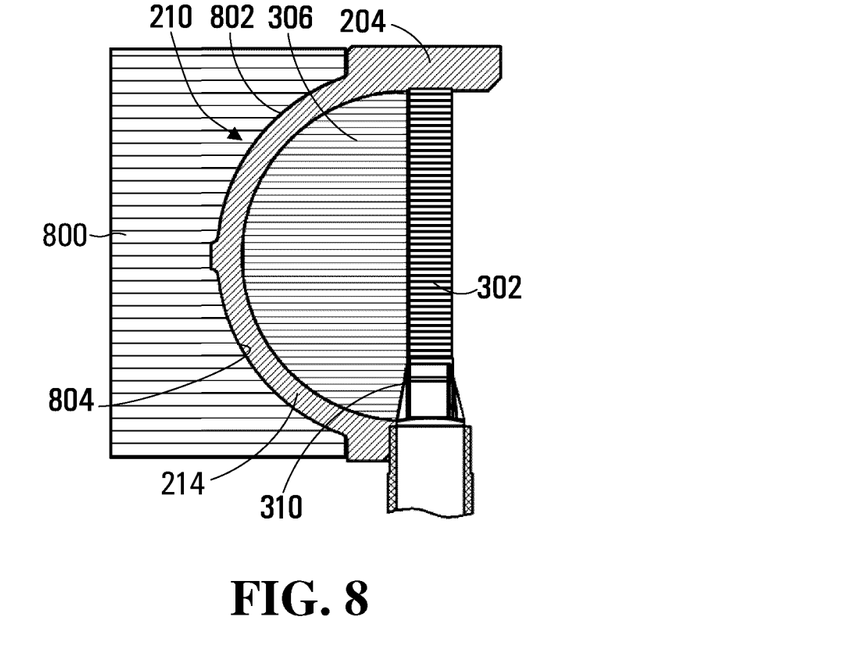
FIG. 8 is a cross sectional view of a thermally conductive body for coupling thermal energy into the thermal input portion of the thermal apparatus shown in FIG. 3.

The thermal input portions 210 shown in FIG. 3 may be placed in direct thermal communication with the thermal energy source 118, such that thermal energy received from the source is transmitted through the wall 214 and through the thermal conductor 306 to the thermal energy receiving surface 310. Referring to FIG. 8, in another embodiment the thermal input portion 210 of the housing 204 shown in FIG. 3 includes a thermally conductive body 800 disposed in thermal contact with an outer surface 802 of the curved wall 214. The thermally conductive body 800 may be a copper block having an inner surface 804 having a curvature that matches a curvature of the wall 214. The thermally conductive body 800 may be heated by the thermal energy source 118. In some embodiments the thermally conductive body 800 may be configured to transfer heat to more than one thermal apparatus.

Figure 9:
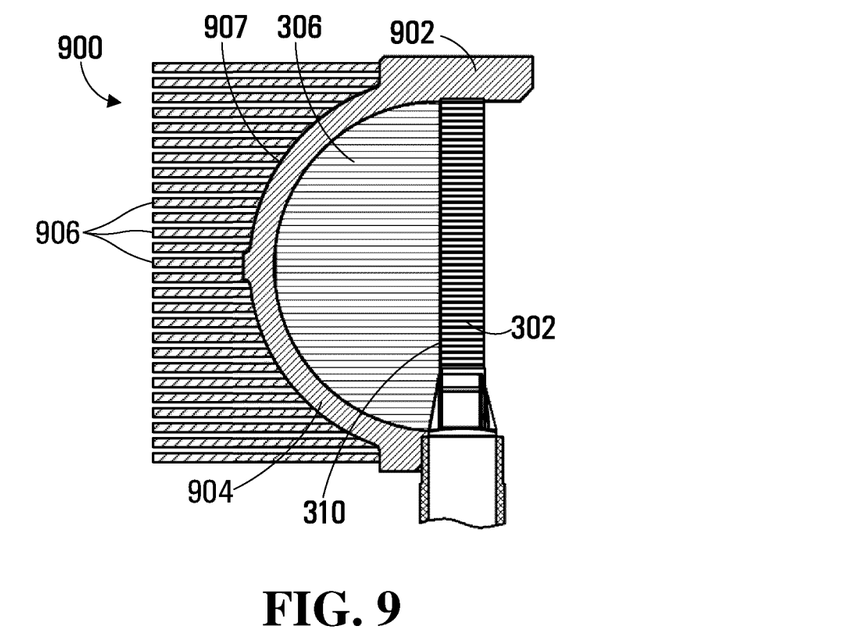
FIG. 9 is a cross sectional view of an alternative thermal input portion for implementing the thermal apparatus shown in FIG. 3.

Referring to FIG. 9, in another embodiment a thermal input portion 900 of a housing 902 includes a curved wall 904. The thermal input portion 900 has a plurality of protrusions 906 extending outwardly from an outer surface 908 of the wall 904. The protrusions 906 may be configured as fins (i.e. extending into the page) or as a plurality of pins spaced apart vertically and horizontally over the outer surface 908. In this embodiment the thermal energy source 118 may be a flow of heated fluid, such as an exhaust gas. The protrusions 906 provide an extended surface area for receiving thermal energy from the heated fluid. The protrusions 906 transfer the received thermal energy through the wall 904, through the thermal conductor 306, and to the thermal energy receiving surface 310 or the first heat exchanger 302.

In other embodiments the thermal input portion 210 of the thermal apparatus 200 may be placed in thermal contact with a surface of a heat pipe (not shown) or the thermal input portion may form part of the heat pipe. A heat pipe transfers heat between first and second thermal interface surfaces via thermal conductivity and phase transition of an internal fluid. The second heat transfer interface would be placed in thermal contact with the wall 214 of FIG. 3 or the thermally conductive body 800 in FIG. 8. Heat received at the first heat transfer interface would be effectively transferred to the second heat transfer interface, and into the thermal input portion 210 of the thermal apparatus 200.

Figure 10:
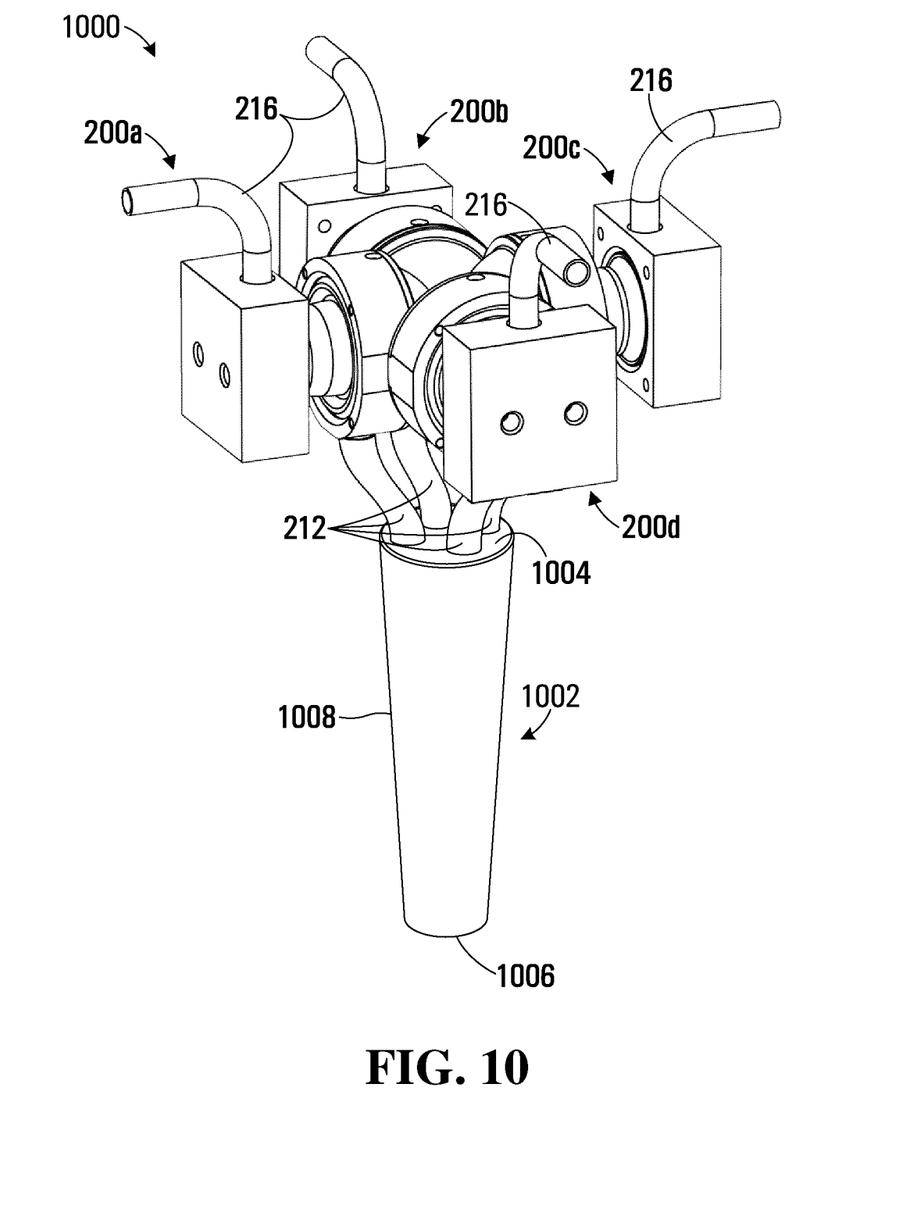
FIG. 10 is a perspective view of four of the thermal apparatus shown in FIGS. 2A and 2B connected in parallel to a thermal buffer duct.

As shown schematically in FIG. 1, the thermal apparatus 116 is connected within the acoustic power loop 114, and forms part of a resonant acoustic circuit. The thermal apparatus 116 may be implemented using a plurality of the thermal apparatus 200, as shown in FIG. 10. Referring to FIG. 10, in an embodiment shown generally at 1000, four of the thermal apparatus 200 shown in FIGS. 2A and 2B (200*a*, 200*b*, 200*c*, and 200*d*) have their respective first fluid ducts 212 connected in parallel to a common thermal buffer duct 1002. The thermal buffer duct 1002 has a first end 1004 in fluid communication with the respective first fluid ducts 212 of the thermal apparatus 200*a*, 200*b*, 200*c*, and 200*d*. The thermal buffer duct 1002 has a second end 1006, which would be connected to the second transmission duct 112 in FIG. 1. The respective second fluid ducts 216 of the thermal apparatus 200*a*, 200*b*, 200*c*, and 200*d* may be connected to the first transmission duct 110 in FIG. 1. The thermal buffer duct 1002 has a profiled wall 1008 that is shaped to reduce convective heat transfer through circulating gas flows within the duct during operation of the thermoacoustic transducer 100. The profile of the wall 1008 of the thermal buffer duct 1002 is selected to promote the temperature-stratified column of working gas by suppressing acoustically driven streaming. Determination of a specific profile for the profiled wall 1008 may be in accordance with calculations provided for a tapered pulse tube disclosed in U.S. Pat. No. 5,953,920 to Swift et al., which is incorporated herein by reference in its entirety. The thermal buffer duct 1002 allows the transmission of acoustic power in the working gas through the thermal buffer duct, while minimizing parasitic heat transfer between the end 1004 the end 1006. Parasitic heat transfers would include heat conduction within the wall 1008, gravity driven convective flow, acoustically driven streaming, and thermoacoustic bucket brigade heat transfer along the walls of the thermal buffer duct. Such parasitic heat transfers are further described in Swift (referenced above).

Figure 11A:
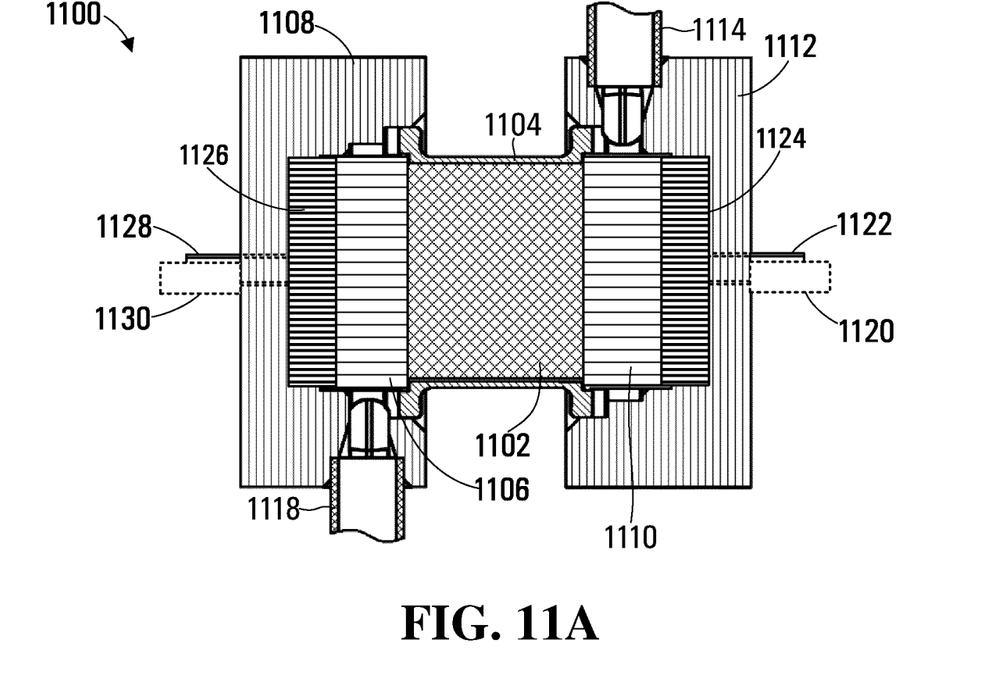
FIG. 11A is a cross sectional view of a thermal apparatus in accordance with another disclosed embodiment.

The above embodiments of the thermal apparatus 200 have been described in the context of a heat engine. Referring to FIG. 11A, a thermal apparatus for use in a cooler or heat pump implementation is shown in cross sectional view generally at 1100. The thermal apparatus 1100 includes a regenerator 1102 enclosed within a sleeve 1104. The thermal apparatus 1100 also includes a first heat exchanger 1106 enclosed by a portion of the sleeve 1104 and a housing portion 1108, and a second heat exchanger 1110 enclosed by a portion of sleeve 1104 and by a housing portion 1112. An oscillating flow of working gas is received via fluid ducts 1114 and 1118 and flows through fluid flow passages within the first heat exchanger 1106, the regenerator 1102, and second heat exchanger 1110 generally as described above. The housing portion 1112 includes an additional heat exchanger 1124 in thermal contact with the second heat exchanger 1110. The additional heat exchanger 1124 is supplied with a heat transfer liquid via an inlet 1120 and an outlet 1122. In this embodiment the housing portion 1108 includes an additional heat exchanger 1126 in thermal contact with the first heat exchanger 1106. The additional heat exchanger 1126 is supplied with a heat transfer liquid via an inlet 1128 and an outlet 1130.

Acoustic energy generated by cyclic displacement of the diaphragm 104 (FIG. 1) is converted in the thermal apparatus 1100 to cause a transfer of thermal energy from the heat transfer liquid flowing through the additional heat exchanger 1126. Thermal energy is removed by the heat transfer liquid flowing through the additional heat exchanger 1124. The heat transfer liquid flowing through the additional heat exchanger 1126 will thus be cooled with respect to the heat transfer liquid flowing through the additional heat exchanger 1124.

Figure 11B:
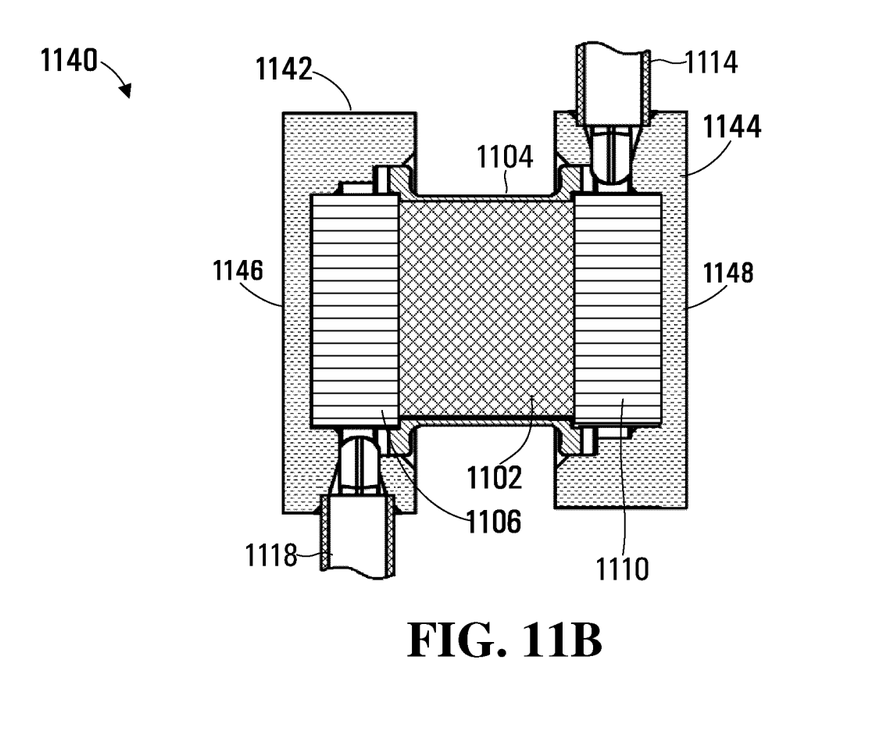
FIG. 11B is a cross sectional view of a thermal apparatus in accordance with a further disclosed embodiment.

Referring to FIG. 11B, an alternative embodiment of a thermal apparatus is shown at 1140. In this embodiment the additional heat exchangers 1124 and 1126 are omitted and the housing portions 1108 and 1112 of FIG. 11A may be replaced by respective housing portions 1142 and 1144. The housing portion 1142 provides a heat transfer surface 1146, which may be placed in thermal contact with an object or fluid to be cooled. In one embodiment the object being cooled may be a heat pipe (not shown). Similarly, the housing portion 1144 provides a heat transfer surface 1148, which may be placed in thermal contact with an object or fluid that is able to absorb heat from the thermal apparatus 1140. In this embodiment, the temperatures on both sides of the thermal apparatus 1140 are well below the creep onset temperatures of common engineering materials. In one embodiment the housing portions 1142 and 1144 may be fabricated from a high thermal conductivity material such as copper rather than the creep resistant materials described above in connection with the high temperature FIG. 3 embodiment.

Figure 11C:
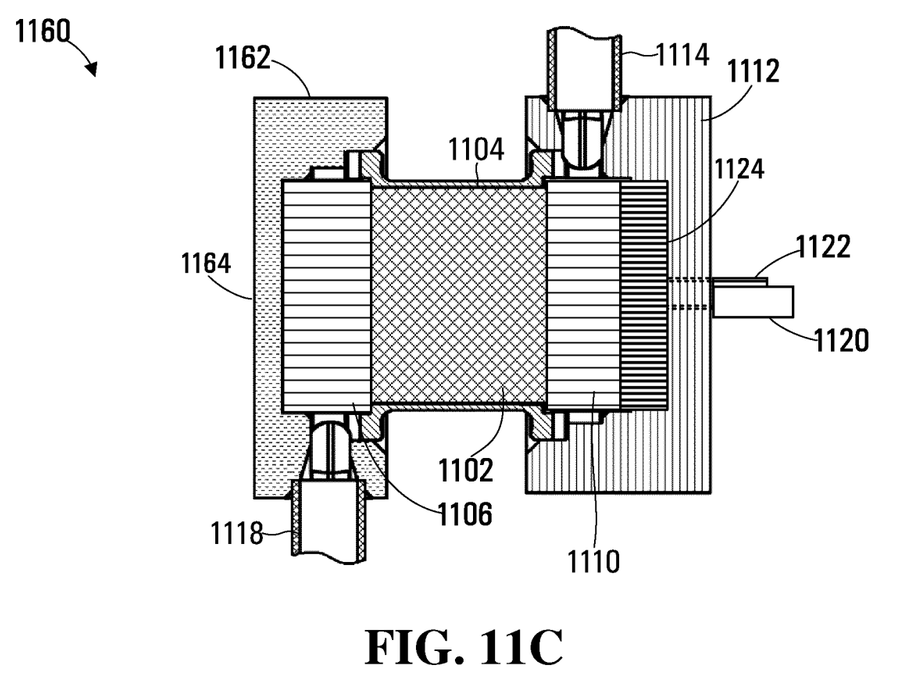
FIG. 11C is a cross sectional view of a thermal apparatus in accordance with yet another disclosed embodiment.

Referring to FIG. 11C, another embodiment of a thermal apparatus is shown at 1160. In this embodiment the additional heat exchanger 1126 is omitted and the housing portion 1108 of FIG. 11A replaced by a housing 1162. The housing portion 1162 provides a heat transfer surface 1164, which may be placed in thermal contact with an object or fluid to be cooled. The object may be a heat pipe, for example. The housing portion 1112 remains configured as described in FIG. 11A. In a further embodiment (not shown), the housing portions 1162 and 1112 of FIG. 11C may be exchanged, such that a heat transfer liquid is cooled while heat is removed via a heat pipe or other object.

Figures 12A, 12C:
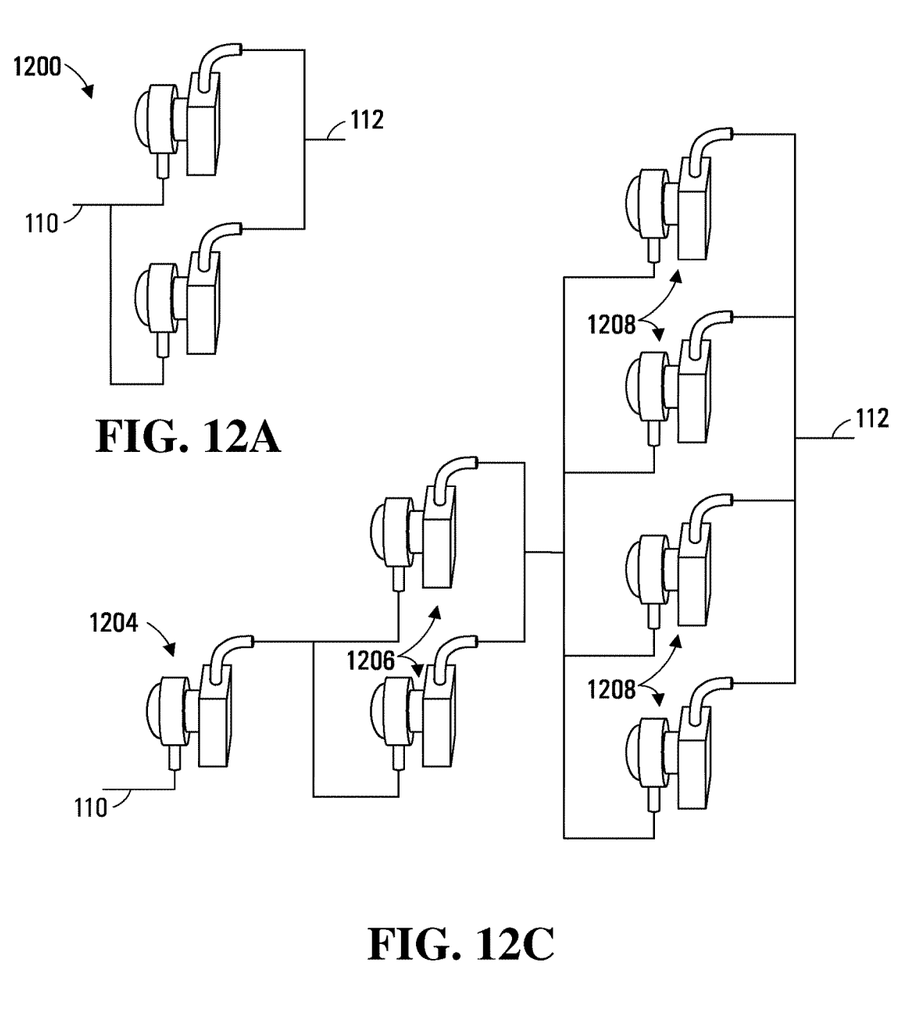
FIG. 12A is a schematic view of a pair of thermal apparatus connected in parallel.
FIG. 12C is a schematic view of a series/parallel cascade of thermal apparatus.
Figure 12B:
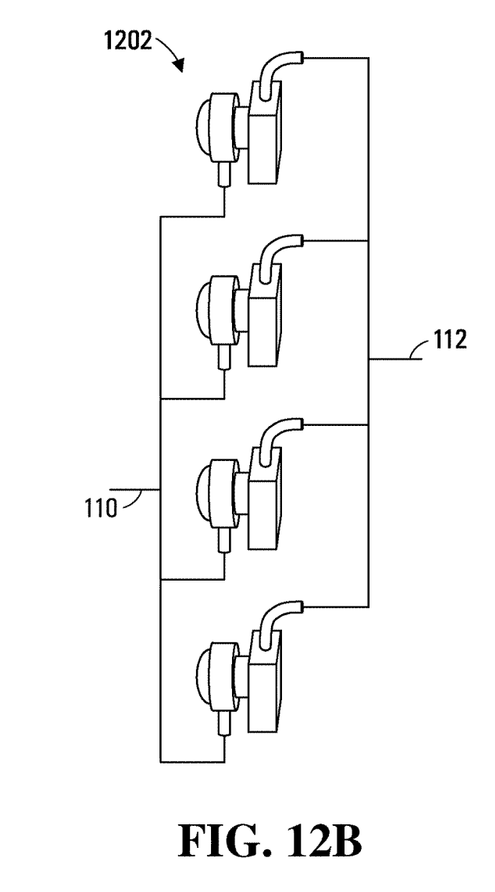
FIG. 12B is a schematic view of four thermal apparatus connected in parallel.

The thermal apparatus 200 and thermal apparatus 1100 both have a modular configuration that facilitates connection in serial, parallel, or a combination of serial and parallel connections for implementing thermoacoustic transducers having different power conversion capacities. Various configurations of multiple thermal apparatus are shown in FIGS. 12A to 12C. Referring to FIG. 12A, in one embodiment shown at 1200 two of the thermal apparatus modules may be connected in parallel between the first transmission duct 110 and second transmission duct 112 (FIG. 1) for implementing a thermoacoustic transducer. Referring to FIG. 12B, in another embodiment shown at 1202 four of the modular thermal apparatus may be connected in parallel for implementing a thermoacoustic transducer that is capable of generating a greater electrical power or providing a greater heat pumping capacity than a single apparatus.

In a third embodiment shown in FIG. 12C, a single thermal apparatus 1204 is coupled in series with a pair of parallel connected thermal apparatus 1206. The pair of parallel connected thermal apparatus 1206 are serially connected to a stage 1208 having four of the thermal apparatus 1208, connected in parallel. The thermal apparatus 1208 connect to the second transmission duct 112. The embodiment shown in FIG. 12C may be capable of generating higher electrical powers when configured as an engine. Various other serial/parallel configurations are possible and will support an output power for the thermoacoustic transducer 100 dependent on the capacity of each of the thermal apparatus modules for converting thermal energy into acoustic energy. In the embodiment shown, the number of thermal apparatus in each successive stage of the cascade doubles, which may be a suitable configuration for high temperature operation. However, in other lower temperature embodiments the number of modular thermal apparatus in each stage units may not double for each successive stage. For example, the cascade may have two modules in the first stage, three in the second, and four in the third stage. In the embodiment shown in FIG. 12C the modules 1206 of the second cascade stage are connected in parallel, before connecting to the modules 1208 of the third cascade stage. In other embodiments the upper depicted module 1206 may be connected to parallel connected inputs of the two upper modules 1208 in the third cascade stage, while the lower depicted module 1206 may be connected to parallel connected inputs of the two lower modules 1208. Various other arrangements of serial and/or parallel connections between may be implemented.

Each successive stage in the cascade may be capable of receiving thermal energy at a different temperature. For example, the single thermal apparatus 1204 may receive thermal energy at a first temperature, the parallel connected thermal amplifiers 1208 at a second different temperature, and the parallel connected pairs of thermal amplifiers 1208 at a third different temperature. In a cryocooler embodiment that implements a series/parallel cascade arrangement, the higher acoustic power and hence larger cooling power stages may be used to cool radiation shields at an intermediate temperature. This would have the advantage of reducing a parasitic heat load on the lowest acoustic power and lowest temperature stage. In this arrangement the temperature sources and sinks would also be in a cascade with the heat output of lowest temperature stage 1204 providing a portion of the heat input to medium temperature stage 1206 and the heat output of medium temperature stage providing a portion of the heat input to highest temperature stage 1208.

The embodiments described above provide a modular thermal apparatus 200 that is capable of sustaining a working pressure of the enclosed working gas. The thermal apparatus 200 may thus be operated in the ambient atmospheric pressure environment and need not be enclosed within a pressure vessel. Some prior art thermal apparatus are required to be enclosed within a pressurized vessel, which is maintained at a pressure corresponding to a static pressure of the working gas. The housing 202 of the thermal apparatus 200 is configured to withstand the substantial difference between the working gas pressure and atmospheric pressure. The modular configuration of the thermal apparatus 200 facilitates volume manufacturing of the thermal apparatus for incorporation in thermoacoustic transducers of differing power generation capacity.

While specific embodiments have been described and illustrated, such embodiments should be considered illustrative only and not as limiting the disclosed embodiments as construed in accordance with the accompanying claims.

What is claimed is:

1. A modular thermal apparatus for performing an energy transformation between thermal energy and acoustic energy, the apparatus comprising:
   a housing;
   first and second fluid ducts extending through the housing;
   a regenerator providing a plurality of regenerator fluid passages extending in an axial direction between first and second spaced apart surfaces, the regenerator being enclosed within a regenerator sleeve portion of the housing;
   a first heat exchanger within the housing, the first heat exchanger including:
      a thermally conductive body configured to conduct thermal energy in a direction substantially aligned with the axial direction;
      a first plurality of fluid passages extending through the thermally conductive body and providing fluid communication between the first fluid duct and the plurality of regenerator fluid passages at the first surface of the regenerator, the first plurality of fluid passages oriented transversely with respect to the axial direction at the first fluid duct and changing direction within the thermally conductive body to terminate in fluid communication and axially aligned with the plurality of regenerator fluid passages at the first surface of the regenerator;
   a second heat exchanger within the housing, the second heat exchanger including:
      a thermally conductive body;
      a second plurality of fluid passages extending through the thermally conductive body and providing fluid communication between the second fluid duct and the plurality of regenerator fluid passages at the second surface of the regenerator;
   wherein the first and second heat exchangers are operable to transfer thermal energy between the respective heat exchangers and an external thermal energy source or thermal energy sink;
   wherein the housing is configured to withstand a pressure associated with a pressurized working gas within the first fluid passages, the regenerator fluid passages, and the second fluid passages, the first and second fluid ducts providing for connection of the thermal apparatus as a module within an acoustic power loop to cause a periodic flow of the pressurized working gas through the respective fluid passages of the apparatus, the periodic flow facilitating an exchange of thermal energy between the working gas and the first and second heat exchangers; and
   wherein the housing comprises a housing portion enclosing at least one of the first heat exchanger and the second heat exchanger, the housing portion comprising a thermal input portion for receiving thermal energy by conduction through a curved wall of the thermal input portion, wherein the curved wall is symmetric about a regenerator axis extending through a center of the regenerator in the axial direction.

2. The apparatus of claim 1 wherein the thermally conductive body of the second heat exchanger is configured to conduct thermal energy in a direction substantially aligned with the axial direction and wherein the second plurality of fluid passages are oriented transversely with respect to the axial direction at the second fluid duct and change direction within the thermally conductive body to terminate in fluid communication and axially aligned with the plurality of regenerator fluid passages at the second surface of the regenerator.

3. The apparatus of claim 1 wherein the housing portion is sealingly connected to the regenerator sleeve.

4. The apparatus of claim 1 wherein the curved wall is capable of withstanding a working gas pressure at an elevated temperature associated with the thermal energy.

5. The apparatus of claim 1 further comprising a thermal conductor disposed to conduct thermal energy from the thermal input portion to the thermally conductive body.

6. The apparatus of claim 1 wherein the thermal conductor comprises a copper body having a curved surface corresponding to an inner surface of the curved wall of the thermal input portion of the housing, and wherein the curved surface of the copper body is diffusion bonded to the inner surface of the thermal input portion.

7. The apparatus of claim 1 wherein the curved wall of the thermal input portion comprises one of:
a single curved wall;
a plurality of adjacent curved walls; or
a generally hemispherical curved wall.

8. The apparatus of claim 1 wherein the thermal input portion comprises a plurality of protrusions extending outwardly from an outer surface of thermal input portion, the protrusions providing an extended surface area for exchanging thermal energy between the thermal input portion and a thermal energy source or sink.

9. The apparatus of claim 1 wherein the thermal input portion comprises a material capable of withstanding an elevated temperature associated with the thermal energy.

10. The apparatus of claim 9 wherein the elevated temperature is a temperature above 450° C. and the material of the thermal input portion comprises a stainless steel material.

11. The apparatus of claim 9 wherein the elevated temperature is a temperature above 600° C. and the material of the thermal input portion comprises a superalloy.

12. The apparatus of claim 1 further comprising a third heat exchanger within the housing for transferring thermal energy between a heat transfer liquid flowing through the third heat exchanger and the thermally conductive body of at least one of the first heat exchanger and the second heat exchanger.

13. The apparatus of claim 1 wherein each of the thermally conductive bodies of the first and second heat exchangers are in thermal communication with one of:
a heat transfer liquid;
a heat pipe; or
an external thermally conductive body.

14. The apparatus of claim 1 wherein the regenerator sleeve comprises a wall having:
a wall thickness selected to reduce thermal conduction in the axial direction between the first heat exchanger and the second heat exchanger; and
an increased wall thickness at an end proximate the first heat exchanger to provide sufficient creep strength to withstand operation at the elevated temperature over an expected lifetime of the apparatus.

15. The apparatus of claim 1 wherein a plurality of the modular thermal apparatus of claim 1 are connected in a parallel configuration in which respective first fluid ducts and second fluid ducts are connected in parallel within the acoustic power loop.

16. The apparatus of claim 15 wherein the acoustic power loop comprises a common thermal buffer duct and wherein the first fluid ducts are connected in fluid communication with the thermal buffer duct, the thermal buffer duct being shaped to reduce convective heat transfer from the working gas due to circulating gas flows within the thermal buffer duct.

17. The apparatus of claim 1 wherein a plurality of the modular thermal apparatus of claim 1 are connected in a serial configuration in which respective first fluid ducts and second fluid ducts are connected in series within the acoustic power loop.

18. The apparatus of claim 1 wherein a plurality of the apparatus of claim 1 are connected in a cascade within the acoustic power loop, the cascade of comprising at least one of:
one or more of the apparatus connected in a series configuration within the acoustic power loop; and
a plurality of the apparatus having first fluid ducts and second fluid ducts connected in a parallel configuration within the acoustic power loop.

19. The apparatus of claim 1 wherein thermal energy is received at elevated temperature at the thermally conductive body of the first heat exchanger and thermal energy is rejected at the thermally conductive body of the second heat exchanger at a lower temperature and wherein the apparatus acts as a thermal amplifier for amplifying acoustic power within the acoustic power loop.

20. The apparatus of claim 1 wherein mechanical energy received within the acoustic power loop is converted in the apparatus to cause thermal energy to be received at a low temperature at the thermally conductive body of the first heat exchanger and thermal energy to be rejected at the thermally conductive body of the second heat exchanger at a higher temperature.

* * * * *